No. 774,413. PATENTED NOV. 8, 1904.
A. A. BAILLEY.
CLOTH WHEEL FOR KNITTING MACHINES.
APPLICATION FILED APR. 29, 1904.
NO MODEL.

Witnesses
R. A. Boswell
James R. Mansfield

Inventor
Albert A. Bailley
By Alexander & Dowell
Attorneys

No. 774,413. Patented November 8, 1904.

UNITED STATES PATENT OFFICE.

ALBERT A. BAILLEY, OF COHOES, NEW YORK, ASSIGNOR TO TOMPKINS BROTHERS COMPANY, OF TROY, NEW YORK.

CLOTH-WHEEL FOR KNITTING-MACHINES.

SPECIFICATION forming part of Letters Patent No. 774,413, dated November 8, 1904.

Application filed April 29, 1904. Serial No. 205,611. (No model.)

*To all whom it may concern:*

Be it known that I, ALBERT A. BAILLEY, of Cohoes, in the county of Albany and State of New York, have invented certain new and useful Improvements in Cloth-Wheels for Knitting-Machines; and I hereby declare that the following is a full, clear, and exact description thereof, reference being had to the accompanying drawings, which form part of this specification.

This invention is an improvement in cloth-wheels or rotary pressers especially designed for use in connection with knitting-machines; and its objects are to enable presser-disks of different diameter to be interchangeably mounted on the hub; second, to secure the disks to the hub in such manner that no oil can escape past the disk onto the cloth, and, third, to prevent oil escaping from the hub-bearings as the wheel revolves; and to these ends the invention consists in the novel constructions and combinations of parts hereinafter described and claimed, and in the accompanying drawings I have shown an efficient practical form of cloth-wheel embodying my invention.

Figure 1:
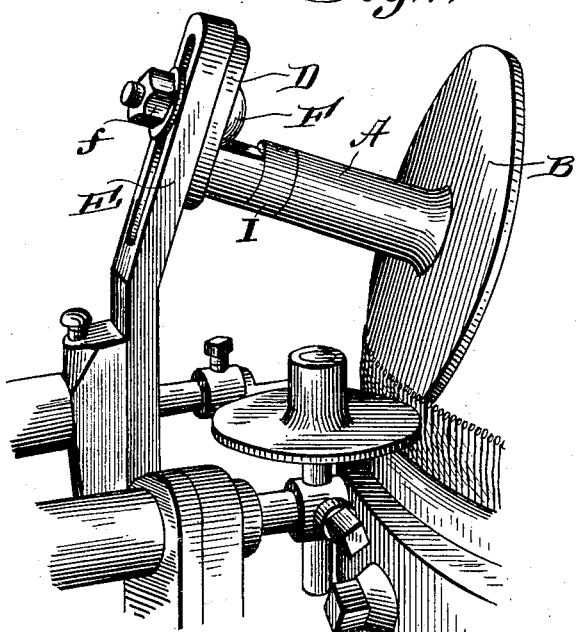
Figure 2:
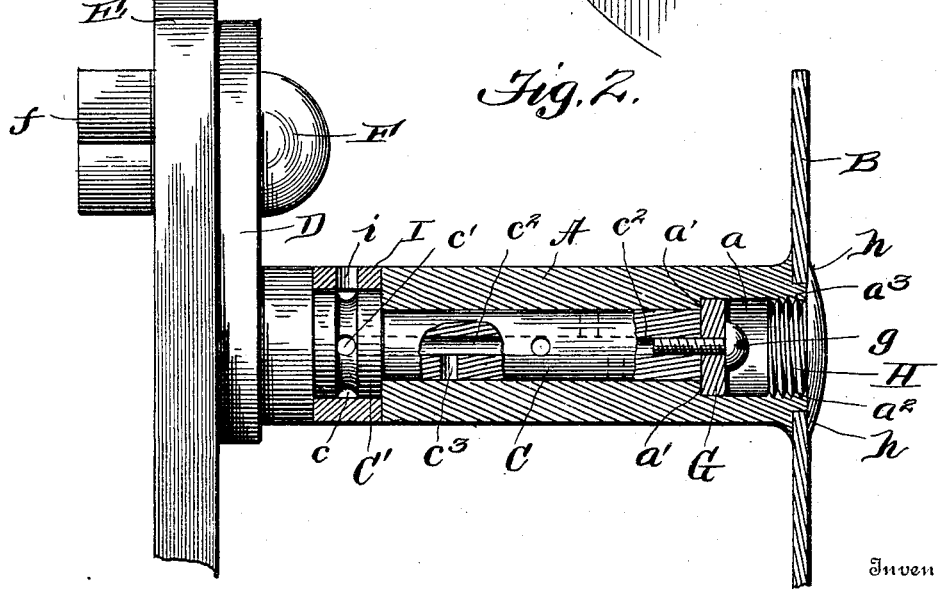

In the drawings, Figure 1 is a side elevation of my improved cloth-wheel attached to a stand and in operating position. Fig. 2 is an enlarged longitudinal section through Fig. 1.

The presser-wheel proper comprises a hub portion A and a disk portion B. Hub A is rotatably mounted on a fixed tubular stub-shaft or spindle C, which is connected to any suitable support, so as to uphold the presser-wheel in working position. As shown, the spindle C is rigidly connected to a slotted bracket D, which is adjustably attached to the upper end of a vertically-slotted standard E by means of a bolt F transfixing the slots in the bracket and standard and secured by a nut *f*. This connection permits vertical and lateral adjustment of the spindle and wheel thereon.

The hub A projects beyond the end of the spindle C and has its bore enlarged, as at $a$, to admit a washer G, which is placed therein and secured to the end of spindle C by a screw $g$. Said washer is of larger diameter than the spindle and bears against the shoulder $a'$ in the hub at the inner end of the enlargement $a$ of the hub-bore, and thus retains the hub securely but rotatively upon the spindle. The outer end of the hub is internally threaded, as at $a^2$, and has a small circumferential flange $a^3$, forming a seat for the disk B, which is thus supported on the hub and is securely confined thereto by means of the retainer H, which engages the threaded part $a^2$ of the hub and is provided with a radially-projecting flange $h$ on its outer end that overreaches the bore of the disk B and holds the latter securely on flange $a^3$ and against the end of the hub, as indicated in the drawings. The disk B is thus removably secured to the hub, and it is obvious that disks of various diameters can be interchangeably attached to the hub and form a part of the wheel when attached by simply unscrewing retainer H, removing the disk on the hub, substituting another disk of the desired diameter therefor, and replacing the retainer without disturbing the connection of the hub with the spindle.

The inner end of hub A abuts against an enlargement C' of the spindle, which enlargement has a circumferential oil-channel $c$, communicating by radial holes $c'$ with an axial bore $c^2$ of the spindle, through which oil passes to radial outlets $c^3$, and thus lubricates the contacting surfaces of the spindle and hub in all positions of the parts.

The enlargement C' is surrounded by a neatly-fitted collar I, having an oil-inlet opening $i$, and this collar can be turned by hand so as to have opening $i$ uppermost, and thus prevent the oil escaping and dripping onto the cloth. Any oil which may work around the washer G will be retained in the chamber $a$ and cannot escape to the surface of the disk.

I consider the capability of using interchangeable disks B one of the principal advantages of my wheel, as it is desirable and sometimes essential to employ cloth-wheels of different diameters on different kinds and grades of work or for use with different diameters of cylinders or on different makes of knitting-machines. By my invention the attendant can readily replace the wheel-disk with one of the desired diameter. Sets of interchangeable disks can be sold with the wheel or can be procured at little expense. With the old-style cloth-wheels the entire wheel had to be changed when a change of diameter was necessary, except where the wheel could be made smaller by cutting down its rims, in which case the wheel was permanently reduced in diameter. Another advantageous feature of my invention is the closing up of the exposed end of the hub, so that no oil can escape to the disk-surfaces. The old wheels have openings in their inner ends or disks through which oil can escape, and this defect frequently results in oil spotting and damaging the goods, while in my wheel if any oil escapes past the spindle end it is caught in the pocket $a$ and retained, so that the oil cannot escape, and my wheel will be less liable to run dry or stick than the old ones. Further, my cloth-wheel is practically unbreakable, as it can be stamped out of sheet metal and does not require expensive polishing and facing processes. The disk, moreover, does not have to be turned except to true up its outer edge and the central opening. The old wheels were made of cast metal and would frequently break if struck by a wrench or dropped, and they had to be polished and faced, rendering them quite expensive. Another advantageous feature of my wheel is the manner of conducting the oil to the hub and of preventing loss of oil by keeping the oil-hole uppermost. In the old-style wheels the oil-hole was in the hub, and as the wheel revolved some oil would be thrown out of the hole instead of passing to the bearings; but in my wheel by turning collar I so that the hole $i$ is uppermost escape of oil is prevented, and as said collar does not rotate with the hub the oil is kept in the spindle.

While I have described the invention as embodied in a cloth-wheel for knitting-machines, it may be applied to other useful purposes. The lubricating devices, including the apertured spindle, hub, and collar, may be usefully employed in other machines.

Having thus described my invention, what I therefore claim as new, and desire to secure by Letters Patent thereon, is—

1. A cloth-wheel comprising a spindle, a hub rotatably journaled thereon, and projecting beyond the end thereof, and a disk removably attached to the projecting end of said hub, and interchangeable with similar disks of different diameters, without removing the hub from the spindle.

2. A cloth-wheel, comprising a spindle, a hub rotatably journaled and confined on said spindle, and a disk removably attached to the outer end of said hub, and interchangeable with similar disks of different diameters, without removing the hub from the spindle.

3. A cloth-wheel, comprising a spindle, a hub rotatably confined on the spindle and projecting beyond the end thereof, a disk, and a retainer confining said disk to the hub, said disk being interchangeable with disks of different diameters.

4. A cloth-wheel, comprising a spindle, a hub rotatably confined on the spindle and projecting beyond the end thereof, a removable disk on the projecting end of the hub, and a threaded retainer confining said disk to the hub.

5. In combination, a spindle provided with oil-passages, a hub journaled thereon, a disk on the hub, and a collar fitted on the spindle around the oil-inlet, substantially as described.

6. A cloth-wheel comprising a spindle provided with oil-passages, a hub journaled thereon, a removable disk on the outer end of the hub, and a collar fitted on the spindle around the oil-inlet.

7. In combination, a spindle provided with oil-passages, a hub rotatably mounted on said spindle, and a loose collar provided with an oil-inlet opening fitted on the spindle, and confined thereon by the hub, substantially as described.

8. In combination, a spindle having an enlargement at its inner end, and provided with oil-passages; a hub rotatably mounted on said spindle, and a loose collar provided with an oil-inlet opening fitted on the enlargement and confined thereon by the hub, substantially as described.

9. In combination, a spindle, a hub journaled thereon, and projecting beyond the end thereof, means engaging the spindle within the hub for confining the hub to the spindle, and a disk attached to the hub, substantially as described.

10. In combination, a spindle provided with oil-passages, a hub rotatably mounted on said spindle, a loose collar provided with an oil-inlet opening fitted on the spindle, and confined thereon by the hub, and a disk attached to the outer end of the hub, substantially as and for the purpose described.

11. In combination, a spindle having an enlargement at its inner end, and provided with oil-passages; a hub rotatably mounted on said spindle, a loose collar provided with an oil-inlet opening fitted on the enlargement and confined thereon by the hub, and a disk attached to the outer end of the hub, substantially as and for the purpose described.

12. In combination, a spindle, a hub journaled thereon, and projecting beyond the end thereof, means attached to the spindle within the hub for confining the hub to the spindle, a disk mounted on the outer end of the hub, and a retainer closing the outer end of the hub and confining the disk thereto, substantially as described.

13. In combination, a bracket, a spindle attached thereto having an enlargement at its base, said spindle and enlargement having oil-passages, a loose collar on said enlargement provided with an oil-inlet, a hub rotatably mounted on said spindle, means for confining the hub to the spindle; and means for closing the outer end of the hub, substantially as described.

14. In combination, a bracket, a spindle attached thereto having an enlargement at its base, said spindle and enlargement having oil-passages, a loose collar on said enlargement provided with an oil-inlet, a hub rotatably mounted on said spindle, means for confining the hub to the spindle; a removable disk mounted on the outer end of the hub, and a retainer engaging the outer end of the hub to retain the disk in position thereon and close the hub-bore, all substantially as and for the purpose described.

In testimony that I claim the foregoing as my own I affix my signature in presence of two witnesses.

ALBERT A. BAILLEY.

In presence of—
WILLIAM W. MORRILL,
ERNST TOMPKINS.